United States Patent
Komiyama

(10) Patent No.: US 10,371,923 B2
(45) Date of Patent: Aug. 6, 2019

(54) LENS CONTROL APPARATUS AND LENS CONTROL METHOD

(71) Applicant: Olympus Corporation, Hachioji-shi, Tokyo (JP)

(72) Inventor: Yohei Komiyama, Koganei (JP)

(73) Assignee: Olympus Corporation, Tokyo (JP)

(*) Notice: Subject to any disclaimer, the term of this patent is extended or adjusted under 35 U.S.C. 154(b) by 99 days.

(21) Appl. No.: 15/596,459

(22) Filed: May 16, 2017

(65) Prior Publication Data

US 2017/0357078 A1     Dec. 14, 2017

(30) Foreign Application Priority Data

Jun. 9, 2016    (JP) ................................ 2016-115460

(51) Int. Cl.
| | |
|---|---|
| G02B 7/28 | (2006.01) |
| G02B 7/04 | (2006.01) |
| G02B 7/14 | (2006.01) |
| G02B 7/09 | (2006.01) |
| G02B 7/08 | (2006.01) |
| G02B 7/10 | (2006.01) |

(52) U.S. Cl.
CPC .............. *G02B 7/282* (2013.01); *G02B 7/09* (2013.01); *G02B 7/14* (2013.01); *G02B 7/28* (2013.01); *G02B 7/04* (2013.01); *G02B 7/08* (2013.01); *G02B 7/102* (2013.01)

(58) Field of Classification Search
CPC ... G02B 7/04; G02B 7/08; G02B 7/09; G02B 7/10; G02B 7/102; G02B 7/105; G02B 7/28–40

USPC ........................ 359/233, 822, 824, 825, 826; 396/133–136
See application file for complete search history.

(56) References Cited

U.S. PATENT DOCUMENTS

| | | | | |
|---|---|---|---|---|
| 7,574,126 | B2* | 8/2009 | Honjo ....................... | G02B 7/08 359/820 |
| 7,852,568 | B2* | 12/2010 | Morimoto .............. | G02B 7/102 359/694 |
| 8,520,129 | B2* | 8/2013 | Hongu ................... | G02B 7/282 348/345 |
| 8,724,233 | B2* | 5/2014 | Morimoto .............. | G02B 7/102 359/696 |
| 8,817,169 | B2* | 8/2014 | Kawada .................. | G02B 7/102 348/335 |
| 2011/0158626 | A1 | 6/2011 | Honda | |
| 2013/0027791 | A1* | 1/2013 | Asano ....................... | H02P 8/32 359/824 |
| 2017/0223257 | A1* | 8/2017 | Tani ......................... | G02B 7/08 |
| 2017/0242215 | A1* | 8/2017 | Nakamura ............... | G02B 7/08 |

\* cited by examiner

*Primary Examiner* — Nicholas R. Pasko
(74) *Attorney, Agent, or Firm* — John C. Pokotylo; Pokotylo Patent Services

(57) ABSTRACT

A lens control apparatus for moving a lens in an optical axis direction, including: a stepping motor for driving the lens; a controller for obtaining a drive amount on the basis of an input target position, instructing a rotational position of the stepping motor to perform drive control, wherein the controller obtains, in accordance with a first drive amount when the stepping motor is driven to a current position, a second drive amount from the current position to a target position, a third drive amount obtained by correcting the second drive amount, and instructs a rotational position on the basis of the third drive amount.

8 Claims, 6 Drawing Sheets

LENS CONTROL APPARATUS AND LENS CONTROL METHOD

CROSS-REFERENCE TO RELATED APPLICATIONS

Benefit is claimed, under 35 U.S.C. § 119, to the filing date of prior Japanese Patent Application No. 2016-115460 filed on Jun. 9, 2016. This application is expressly incorporated herein by reference. The scope of the present invention is not limited to any requirements of the specific embodiments described in the application.

BACKGROUND OF THE INVENTION

1. Field of the Invention

The present invention relates to a lens control apparatus and a lens control method which allow a stepping motor to move a lens in an optical axis direction.

2. Description of Related Art

In an imaging device and the like, a stepping motor for moving a lens in an optical axis direction has been conventionally used. Since the stepping motor allows a driving shaft to be rotated in accordance with the number of drive pulses that is input, the number of drive pulses in accordance with a distance to a drive target position is applied to the stepping motor to move the lens to the target position.

In order to perform more precise driving, the stepping motor is driven in micro steps. When the stepping motor is driven in micro steps, a rotation angle for a step width varies in accordance with an excitation phase (for example, refer to Japanese Patent Laid-Open No. 2011-135700 (hereinafter, referred to as "Patent Literature 1")). The variation of the rotation angle is caused by the influence of the detent torque of the motor itself. This influence causes, in wobbling operation in which a minute advancing and retreating driving is repeated to detect a contrast peak, unexpected pulsation of an amplitude amount, thus destabilizing focusing.

Accordingly, in Patent Literature 1, driving is classified into "driving across one phase" and "driving across two phases", and correction for each drive amount is performed. That is, it is proposed to ensure a stable drive amount by driving with a correction value added in accordance with the target step phase.

SUMMARY OF THE INVENTION

A lens control apparatus according to a first aspect of the present invention is a lens control apparatus for moving a lens in an optical axis direction, the lens control apparatus, comprising: a stepping motor for driving the lens; and a controller for obtaining a drive amount on the basis of an input target position, instructing a rotational position of the stepping motor, and performing drive control, wherein the controller obtains, in accordance with a first drive amount when the stepping motor is driven to a current position, and a second drive amount from the current position to the target position, a third drive amount obtained by correcting the second drive amount, and instructs a rotational position on the basis of the third drive amount.

A lens control method according to a second aspect of the present invention is a lens control method of a lens driving apparatus having a stepping motor for moving a lens in an optical axis direction, for obtaining a drive amount on the basis of an input target position, and instructing a rotational position of the stepping motor to drive, the lens control method comprising: reading a first drive amount when the stepping motor is driven to a current position; obtaining, in accordance with a second drive amount from the current position to a target position, a third drive amount obtained by correcting the second drive amount; and instructing a rotational position on the basis of the third drive amount.

DETAILED DESCRIPTION OF THE PREFERRED EMBODIMENTS

Hereinafter, an exemplary application to a digital camera (hereinafter, referred to as "camera" for short) will be described as an embodiment of the present invention. That is, an exemplary application to a camera will be described as an example of a lens control apparatus for moving a lens in an optical axis direction. The camera converts a subject image formed by an optical lens within a lens barrel section, into image data by an imaging section, performs, on the basis of the converted image data, live-view display of the subject image on a display section provided on the back side of the main body, and stores image data of still images or video images on a storage medium. In coordination with a half-pressing operation of a release button, or the like, the camera performs focus detection using a contrast method, a phase difference method, or the like, and moves the optical lens to a focusing position by driving the stepping motor in accordance with the result of focus detection.

Figure 3:
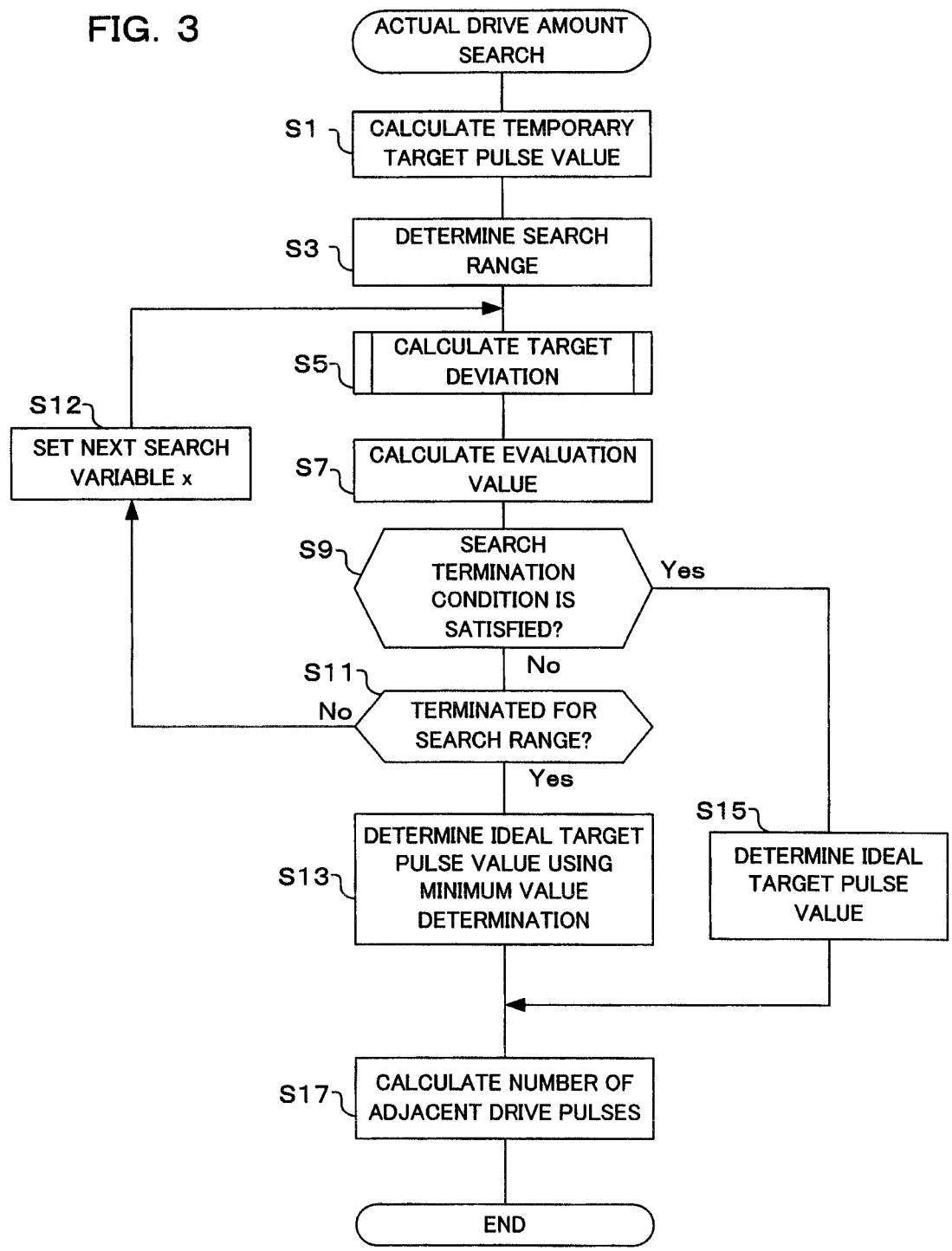
FIG. 3 is a flowchart illustrating an operation of an actual drive amount search of a camera according to an embodiment of the present invention.

When moving the optical lens to the focusing position or the like, the camera determines, on the basis of the moving destination of the lens (target position), a temporary target rotational position (for example, refer to the temporary target pulse value calculation in S1 of FIG. 3), searches a position corresponding to the target position on the basis of the temporary target position (refer to S3, S9, and S11, etc., of FIG. 3), and calculates, on the basis of the searched position, the number of drive pulses (rotational position) of the stepping motor (refer to S13 to S17).

Moreover, when determining a temporary target position, in consideration of an excitation phase at the current position, a first drive amount for reaching the current position, and a second drive amount from the current position to the moving destination, the camera calculates a correction value, and obtains a rotational position of the stepping motor corresponding to the target position using the correction value (i.e., a third drive amount to the target position).

Figure 1:
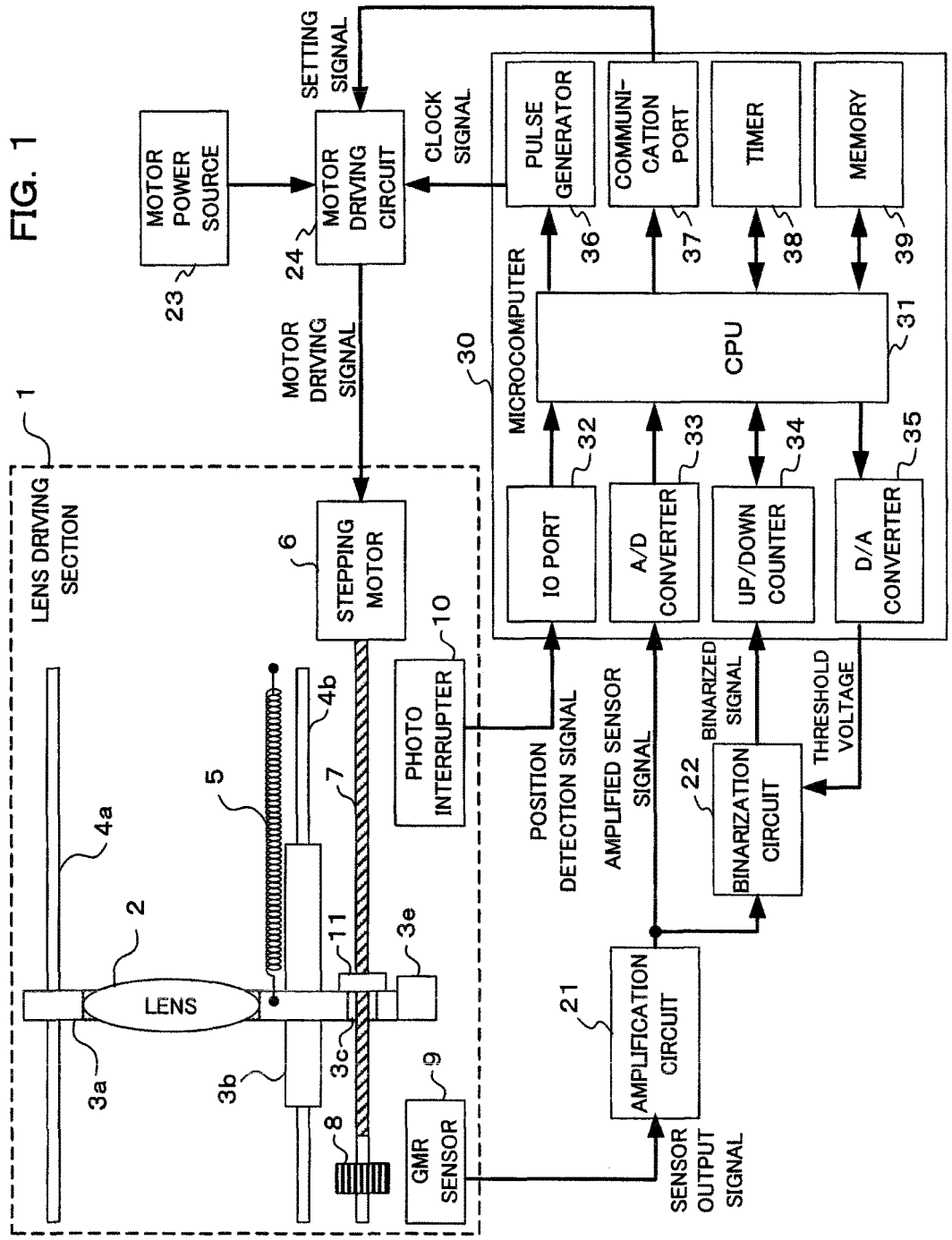
FIG. 1 is a block diagram mainly illustrating an electrical configuration of a camera according to an embodiment of the present invention.

Hereinafter, a preferred embodiment will be described with regard to a camera to which the present invention is applied, referring to the drawings. FIG. 1 is a block diagram illustrating a mechanical configuration of a lens driving section of a camera according to an embodiment of the present invention, and mainly an electrical configuration relating to the lens driving of the camera. Note that, the camera may be an interchangeable lens system camera which includes a camera main body and an interchangeable lens freely detachable and attachable from the camera main body, or the camera main body may be integrated with a lens barrel.

A lens driving section 1 is provided within an interchangeable lens of a lens-integrated camera or a lens-interchangeable camera. There are provided, within the lens driving section 1, an optical lens (hereinafter, referred to as "lens" for short) 2, a lens frame 3, guide shafts 4a, 4b, a spring 5, a stepping motor 6, a lead screw 7, a scale magnet 8, a GMR (Giant Magneto Resistive Effect) sensor 9, and a photo interrupter 10.

The lens 2 has one or more optical lenses and forms a subject image. The lens 2 is held by the lens frame 3. The guide shaft 4a and the guide shaft 4b provided parallel to the guide shaft 4a extend along an optical axis direction of the lens 2, and fixed to a lens mirror frame or the like. The lens 2 is suspended by the spring 5, and provided between the lens frame 3 and a fixing member of the lens mirror frame. The spring 5 provides the lens frame 3 with biasing force rightward in the drawing.

The lens frame 3 described above has a fixed section 3a extending orthogonally to the optical axis direction of the lens 2, and a fitting section 3b integrated with the fixed section 3a and fitted with the guide shaft 4b. In addition, the lens frame 3 has a through-hole 3c through which the lead screw 7 penetrates, and a light shielding blade 3e. The light shielding blade 3e is integrated with the fixed section 3a and provided on one end of the fixed section 3a. The light shielding blade 3e shields light emitted from a light emitting section of the photo interrupter 10 when the lens 2 moves to a reference position.

The stepping motor 6 is rotatably driven upon receiving a two-phase pulse signal including phase A and phase B from a motor driving circuit (motor driver) 24 as a motor driving signal. The stepping motor 6 drives a lens. A rotary driving shaft of the stepping motor 6 is integrated with the lead screw 7. Accordingly, the lead screw 7 rotates forward or reverse in accordance with the motor driving signals applied to the stepping motor 6.

Forward or reverse rotation of the lead screw 7 moves the lens 2 along the optical axis direction via a nut 11 engaged with the lead screw 7. The nut 11 is separate from the lens frame 3. The lens frame 3 is pulled rightward in FIG. 1 by the spring 5, whereby the periphery of the through-hole 3c is brought to abut against the nut 11 engaged with the lead screw 7. With a rotation stopper (not illustrated) of the nut 11 provided on the lens frame 3, rotation of the lead screw 7 moves the nut 11 in the optical axis direction (rightward or leftward in the drawing), and the lens frame 3 abutting thereto also moves in the optical axis direction.

The scale magnet 8, which is integrally provided on one end of the lead screw 7, has S poles and N poles alternately magnetized along the circumferential surface thereof. The GMR sensor 9, which is provided at a position facing the scale magnet 8, and outputs a two-phase signal in accordance with the magnetic field generated by the S poles and N poles of the scale magnet 8. On the basis of detection signals of the scale magnet 8 and the GMR sensor 9, a relative rotational position of the stepping motor 6 (relative position of the lens 2 in the optical axis direction) can be detected. The scale magnet 8 and the GMR sensor 9 function as a position detection section for detecting a signal corresponding to a position of the lens in the optical axis direction.

The photo interrupter 10, which is fixed to a lens mirror frame or the like, has a light emitting section and a light-receiving section. When the lens 2 moves to a reference position, light emitted from the light emitting section is shielded by the light shielding blade 3e. When the light is shielded, the light-receiving section changes its output, and thereby can detect that the lens 2 is located at the reference position. In other words, the light shielding blade 3e and the photo interrupter 10 allow detection of the absolute position (reference position) of the lens 2. The position detection signal from the photo interrupter 10 is output to an IO port 32.

As thus described, the lens driving section 1 according to the present embodiment moves the nut 11 rectilinearly by rotation of the lead screw 7 driven by the stepping motor 6, and moves the lens frame 3 by biasing force of the spring 5 along the guide shafts 4a, 4b. Accordingly, the lens 2 fixed to the lens frame 3 is driven in the optical axis direction. In addition, the scale magnet 8 is attached to the tip of the lead screw 7 at a position facing the GMR sensor 9, and forward or reverse rotation of the lead screw also rotates the scale magnet 8 in the same direction.

The output of the GMR sensor 9 is connected to an amplification circuit 21. The amplification circuit 21 amplifies the two phases of the analog sensor output signal from the GMR sensor 9, respectively, and performs noise removal process of the sensor signal. The amplified sensor signal processed in the amplification circuit 21 is output to an A/D converter 33 and a binarization circuit 22.

The binarization circuit 22 binarizes the two phases of the sensor output signal from the amplification circuit 21, respectively, and outputs the binarized signal to an up/down counter (two-phase counter) 34. When performing binarization, the binarization circuit 22 receives an input of a threshold voltage from a D/A converter 35, and performs the binarization using the threshold voltage.

A microcomputer 30, which has a CPU (Central Processing Unit) 31 and peripheral circuits thereof, operates the entire camera by controlling each section in the camera in accordance with a program stored in a memory 39. Specifically, the microcomputer 30 generates various signals for driving the stepping motor 6 in accordance with various signals from the lens driving section 1, for example. There are provided, as peripheral circuits, the IO (Input/Output) port 32, the A/D (Analog/Digital) converter 33, the up/down counter 34, the D/A (Digital/Analog) converter 35, a pulse generator 36, a communication port 37, a timer 38, and the memory 39.

The microcomputer 30, which obtains a drive amount on the basis of an input target position, functions as a controller for driving by instructing a rotational position of the stepping motor. The controller obtains, in accordance with a first drive amount when driving to a current position (refer to the z-axis in the upper portion of FIG. 5, for example) and a second drive amount for driving from the current position to the target position (for example, refer to S23 of FIG. 4), a third drive amount obtained by correcting the second drive amount (for the correction value, for example, refer to S17 of FIG. 3), and instructs a rotational position on the basis of the third drive amount.

Moreover, the controller described above has an arithmetic section which reads from the memory a deviation amount between a rotational position generated when the stepping motor is driven for the same rotational position with different drive amounts and an actually-stopped rotational position, obtains a correction value from the deviation amount, and obtains a third drive amount from the second drive amount and the correction value. The arithmetic section obtains a correction value in accordance with a relationship between the first drive amount, the second drive amount, and the determination value (for example, refer to S25 to S29 of FIG. 4), and obtains the third drive amount from the second drive amount and the correction value. Moreover, the arithmetic section obtains, when both the first drive amount and the second drive amount are smaller than a determination value, a correction value on the basis of a plurality of deviation amounts (for example, refer to S25, S27, and S29 of FIG. 4), and when one of both the first drive amount and the second drive amount is greater than the determination value, obtains a correction value on the basis of a deviation amount in a region not dependent on a drive amount (for example, refer to S25 and S27 of FIG. 4).

The IO port 32 receives an input of a position detection signal from the photo interrupter 10 and, on the basis of the position detection signal, outputs to the CPU 31 a signal indicating that the lens 2 is located at a reference position.

The A/D converter 33 receives an input of the amplified sensor signal including phase A and phase B from the amplification circuit 21, performs AD conversion on the respective phases of the signal to convert the phase A and phase B of the amplified sensor signal into digital data, and outputs the digital data to the CPU 31.

The D/A converter 35 receives an input of a digital value corresponding to a threshold voltage from the CPU 31, converts the digital value into an analog voltage, and outputs the analog voltage to the binarization circuit 22 as the threshold voltage. A middle point potential of the amplified sensor signal has variation depending on the properties of the GMR sensor 9 or the amplification circuit 21. Accordingly, the middle point potential of phase A and phase B is preliminarily stored in the memory 39 as an adjustment value, and the binarization circuit 22 performs binarization using the middle point potential as the threshold voltage.

The up/down counter 34 receives an input of a binarized signal from the binarization circuit 22, and performs up/down counting. The GMR sensor 9, which outputs a sensor signal including phase A and phase B, performs up/down counting each time a binarized signal is input. Accordingly, it is possible to determine whether the scale magnet 8 is rotating forward or reverse, i.e., to which direction the lens 2 is moving.

The memory 39 has an electrically rewritable volatile memory (e.g., DRAM (Dynamic Random Access Memory), or the like) and an electrically rewritable nonvolatile memory (e.g., flash ROM (Flash Read Only Memory), or the like). The memory 39 stores programs to be executed by the CPU 31, various types of data such as adjustment values of the lens (e.g., values relating to the middle point potential described above), and setting values for driving the lens. As the setting values for driving the lens, the memory 39 stores data (adjustment value) indicating a relationship between a position pulse of the stepping motor (rotational position), and a detection pulse (detection position) by the GMR sensor 9.

The memory 39 functions as a memory for storing a deviation amount between a rotational position generated when the stepping motor is driven to the same rotational position with different drive amounts, and an actually-stopped rotational position. The memory holds a plurality of deviation amounts in accordance with a relationship with drive amounts, and further holds a determination value for using the plurality of deviation amounts, selectively (for example, refer to FIG. 2B and FIG. 5). The plurality of deviation amounts includes a deviation amount of the region depending on a drive amount, and a deviation amount of the region not depending on a drive amount (for example, refer to FIG. 2B). The determination value described above is a drive amount at a boundary between a region where a deviation amount depends on a drive amount and a region where a deviation amount does not depend on a drive amount (for example, refer to Th of FIG. 2B).

The timer 38 performs a timing operation for generating control cycles of feedback control, or measuring the time taken by various operations of the lens. In addition, the timer 38 has a calendar function or the like. The communication port 37 is a port for exchanging signals with the outside of the CPU 31. In the present embodiment, various types of communication are performed via the communication port 37. For example, transmission of setting signals from the communication port 37 to the motor driving circuit 24 is performed.

Upon receiving a control signal from the CPU 31, the pulse generator 36 generates a clock signal (pulse signal) to be output to the motor driving circuit 24 for driving the stepping motor 6. In other words, the pulse generator 36 outputs a clock signal to the motor driving circuit 24, and advances the excitation position of the stepping motor.

The motor driving circuit 24 receives supply of power source voltage from a motor power source 23, and receives inputs of the clock signal from the pulse generator 36 and a setting signal from the communication port 37, and outputs a motor driving signal including a two-phase voltage signal to the stepping motor 6. In addition, the motor driving circuit 24, when outputting the motor driving signal, adjusts the maximum applied voltage of the motor driving signal on the basis of the setting signal from the CPU 31. The motor power source 23 has a power source such as a battery, which is converted into a constant voltage by a constant voltage circuit or the like (not illustrated), and supplies power to the motor driving circuit 24.

When generating a motor driving signal, the CPU 31 within the microcomputer 30 performs an arithmetic operation on the basis of the sensor output signal detected by the GMR sensor 9, and performs management of the drive pulse output by the motor driving circuit 24, setting of driving velocity, setting of driving voltage, and various arithmetic operations of digital data required for feedback control.

Next, a linearity property of the stepping motor will be described, referring to FIG. 2A and FIG. 2B. In the present embodiment, a correction arithmetic operation in accordance with a drive amount is performed, which uses the linearity property of the stepping motor.

Figure 2A:
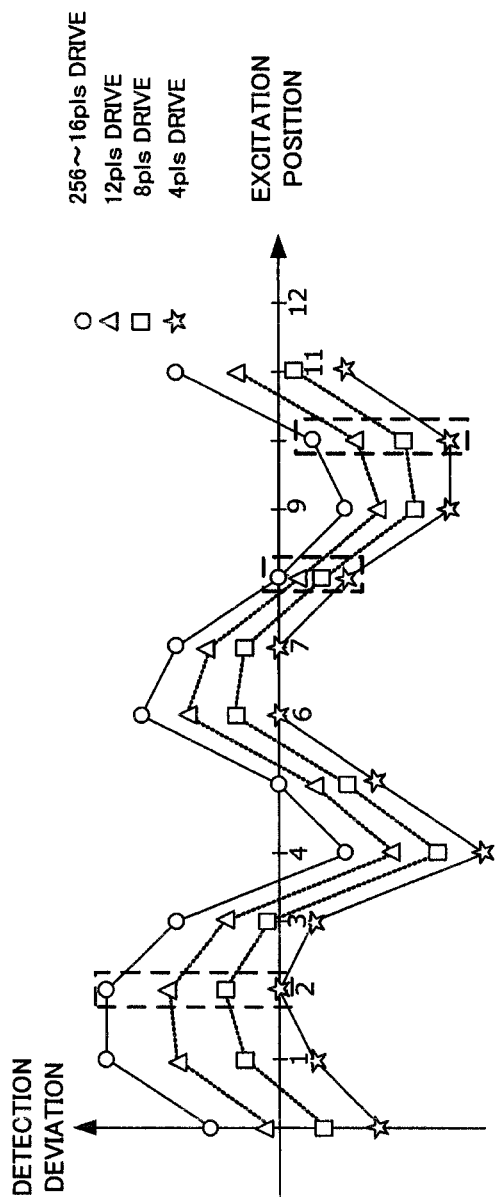
FIGS. 2A and 2B are graphs illustrating a relationship between a drive amount and a detection deviation of a stepping motor in a camera according to an embodiment of the present invention.

FIG. 2A illustrates a relationship of a detection deviation with respect to an excitation position for each drive amount. In FIG. 2A, the horizontal axis represents the excitation position, and the vertical axis represents the detection deviation. The excitation position represented on the horizontal axis (x-axis) corresponds to an instructed stop position (angle) of the stepping motor 6, and the detection deviation represented on the vertical axis (y-axis) corresponds to the difference between an instructed stop position (angle) and a detected actual stop position (angle). In this example, the resolution of an excitation position represented on the horizontal axis (x-axis) is in the unit of 1/64 µstep, and the scale of "1" on the x-axis represents in the unit of 1×1/64 µstep. In addition, the detection deviation on the vertical axis (y-axis) is represented by pls [management pulse unit]. The stepping motor 6 is stopped by the balance between the magnetic force of an excitation coil and the magnetic force of a permanent magnet, and thus such a deviation occurs structurally. In general, such a deviation is referred to as "detent torque deviation".

The white circle, white square, white triangle, and white star marks illustrated in the legend of FIG. 2A represent the magnitude of a drive instructed pulse corresponding to a drive amount. The line connecting "white circles" indicates a detection deviation when the drive amount is from 256 to 16 pls in the unit of 1 pls/256 µstep. The line connecting "white triangles" indicates the detection deviation when the drive amount is 12 pls. The line connecting "white squares" indicates the detection deviation when the drive amount is 8 pls. The line connecting "white stars" indicates the detection deviation when the drive amount is 4 pls. As will been seen from FIG. 2A, the detection deviation indicates a periodically repeated nonlinear relationship depending on an excitation position due to the influence of a detent torque of the stepping motor.

FIG. 2A shows, when viewed from the vertical direction at each point on the x-axis, the detection deviation when the stepping motor is driven with different drive amounts for the same excitation position. FIG. 2B illustrates a relationship between a detection deviation and a drive amount, when specific excitation positions are focused. In FIG. 2B, the horizontal axis represents a drive amount that is driven when a detection deviation is acquired, i.e., a previous drive amount, the vertical axis represents a detection deviation, and the legend represents excitation positions. The drive amount on the horizontal axis (x-axis) is represented by pls [management pulse unit], and the detection deviation on the vertical axis (y-axis) is represented by pls 1/256 µstep unit. The example illustrated in FIG. 2B indicates a detection deviation for each drive amount (represented by a drive instructed pulse) at the excitation positions 2, 8, 10 (1/64 µstep unit) in FIG. 2A. Note that the black circles, black triangles, and black squares correspond to the excitation positions 2, 8, 10, respectively.

Figure 2B:
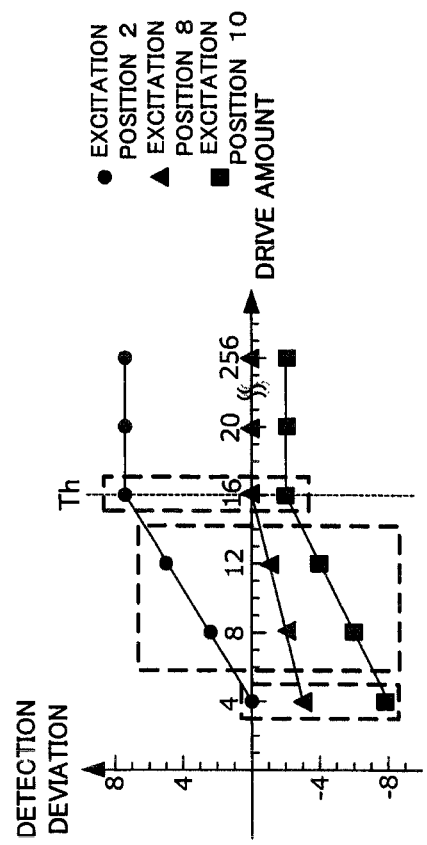

As will been seen from FIG. 2B, the distribution of a detection deviation with respect to an excitation position varies depending on a drive amount with a certain drive amount being as a threshold. In other words, in FIG. 2B, in a range where a drive amount is greater than the threshold Th (range on the right side from the Th in FIG. 2B), the detection deviation is substantially constant. When an excitation position is greater than or equal to the threshold Th, the stop error does not vary. Moreover, in a range where a drive amount is smaller than the threshold Th (range on the left side from the Th in FIG. 2B), a detection deviation linearly varies. As thus described, since a detection deviation amount varies depending on the drive amount instructed to the stepping motor, it is desirable to correct a detection deviation in accordance with a drive amount and optimize a correction arithmetic operation of a stop position.

Note that, in the present embodiment, when the drive instructed pulses are from 256 to 16 pls as illustrated by the white circles, a correction arithmetic operation for a stop position is performed using an adjustment value for normal driving, and when the drive instructed pulses are 4 pls as illustrated using the white stars, a correction arithmetic operation of a stop position is performed by an adjustment value for small pulse driving. The memory 39 stores, as an adjustment value, a relationship between a drive instructed pulse (drive amount) and a detection deviation. The adjustment value for normal driving, and the adjustment value for small pulse driving are calculated on the basis of the detection deviation stored in the memory 39.

A drive amount when acquiring an adjustment value for small pulse driving is defined as a small pulse reference value, and used as a parameter for calculating an adjustment value in accordance with a drive pulse. When the drive pulse (drive amount) is between 4 and 16, an adjustment value is obtained by interpolation calculations on the basis of two kinds of adjustment values (for small pulse driving/for normal driving), a drive pulse acquired as the intermediate value between the adjustment values, and a parameter for the drive instructed amount (refer to S25 to S29 of FIG. 4).

In the lens control according to the present embodiment, in consideration of the property of the stepping motor described above, a detection deviation (correction value) appropriate for "drive amount" is obtained by the linear interpolation using "a drive amount that is a threshold", "detection deviation acquired at a drive amount greater than or equal to a threshold", "a drive amount smaller than or equal to a threshold", "a detection deviation acquired at a drive amount smaller than or equal to a threshold". Furthermore, the correction value for the drive amount obtained by an interpolation arithmetic operation is subjected to a linear interpolation arithmetic operation for a drive position and an excitation position, to thereby establish a correction value used for an actual drive amount search.

Figure 4:
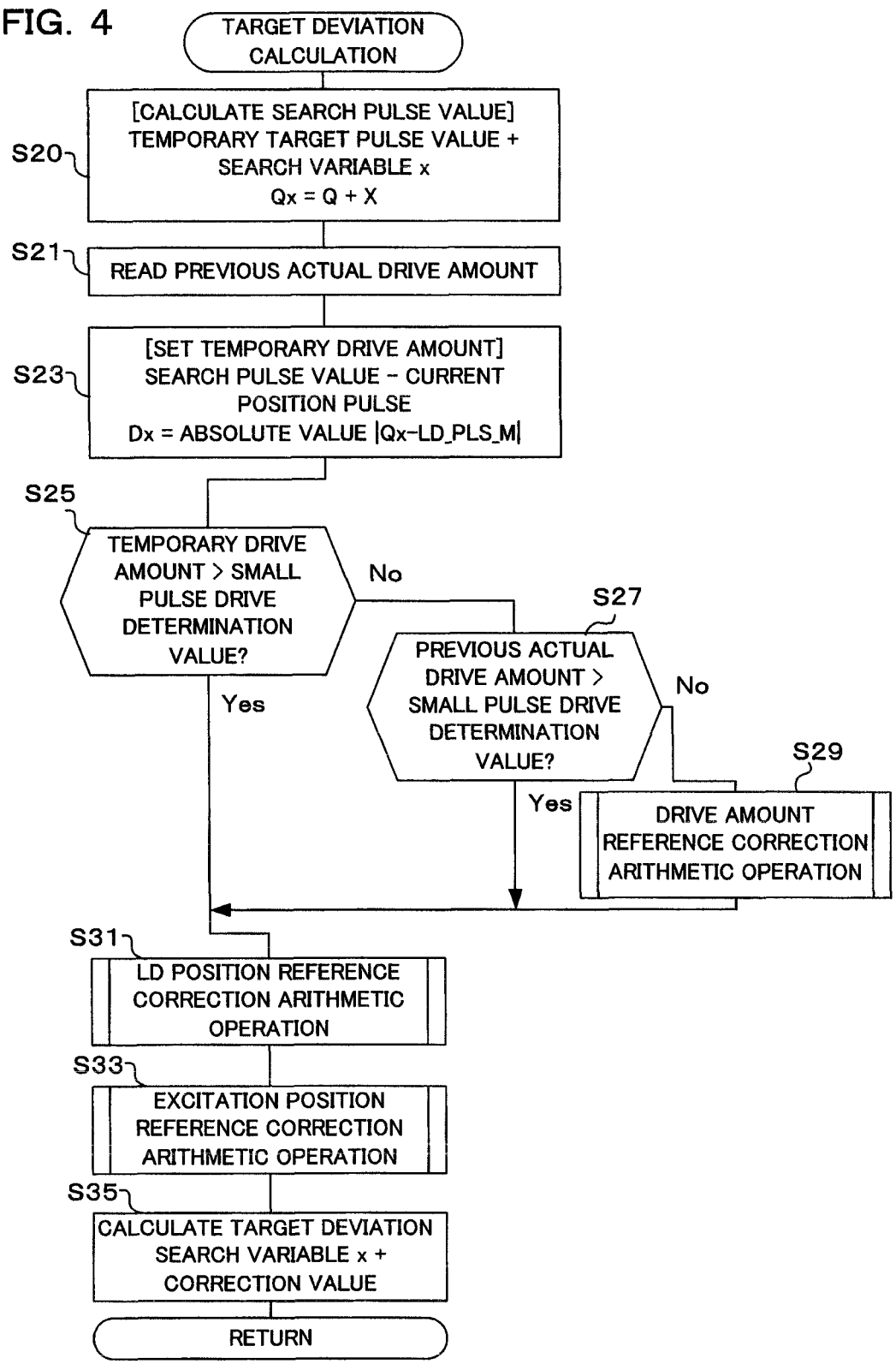
FIG. 4 is a flowchart illustrating an operation of calculation of a target deviation of a camera according to an embodiment of the present invention.

Next, operation of lens control according to the present embodiment will be described, referring to the flowcharts illustrated in FIGS. 3 and 4. The flowcharts illustrated in FIGS. 3 and 4 are implemented by the CPU 31 which controls each section in the camera in accordance with the program stored in the memory 39.

When the actual drive amount search flow illustrated in FIG. 3 is entered, a temporary target pulse value is first calculated (S1). Here, the CPU 31 performs an arithmetic operation on a drive instructed pulse for reaching a lens specified position (the number of pulses to be applied to the stepping motor 6). The drive instructed pulse is calculated on the basis of auto focus detection result, for example, using a phase difference method or a contrast method.

When the temporary target pulse value is calculated, next, a possible range of the search variable x used for a correction value arithmetic operation, in other words, a search range in which a target drive pulse value is changed is determined (S3). Here, a predetermined range adjacent to a position determined on the basis of the temporary target pulse value is determined as the search range. Note that the search range may be limited to a range corresponding to one rotation of the electrical angle, or may be extended to several rotations of the electrical angle.

When the search range is determined, a target deviation is calculated (S5). Here, in order that the stepping motor can accurately stop at s target position, a target deviation for the temporary target pulse value is obtained from the detection deviation, the drive amount, and the excitation position (stop position) illustrated in FIGS. 2A and 2B. The detailed operation of the target deviation will be described below referring to FIG. 4.

When the target deviation is calculated, an evaluation value is next calculated (S7). In the actual drive amount search performed in the flow of FIG. 3, in step S5, a target deviation is calculated on the basis of the temporary target pulse value calculated in step S1 and the search range determined in step S3, and a target drive amount (the number of drive pulses) at which the evaluation value calculated from the target deviation becomes zero is searched. Actually, in some cases, the evaluation value may not be zero, and in this case, a target drive amount (the number of drive pulses) at which the evaluation value becomes minimum within the search range is searched.

When the evaluation value is calculated, it is next determined whether or not a search termination condition is satisfied (S9). As described above, if the evaluation value calculated from the target deviation becomes zero, it is determined that the search termination condition is satisfied.

If a result of the determination in step S9 is that the search termination condition is not satisfied, it is next determined whether or not the search is terminated for the search range (S11). Here, for the search range determined in step S3, it is determined whether a search variable x exceeds the search range. If the search is not terminated for the whole search range, a next search variable x is set (S12). Then, the processing returns to step S5, and after a target deviation is calculated, it is determined whether the evaluation value search termination condition is satisfied. As described above, until the search is terminated for the search range (S11: Yes), or the search termination condition is satisfied (S9: Yes), processing of changing the search variable within the search range, and calculating an evaluation value is repeated.

If a result of the determination in step S9 is that the search termination condition is satisfied, an ideal target pulse value is determined (S15). Since a target drive amount at which an evaluation value becomes zero has been found, a pulse value corresponding to the target drive amount is determined as an ideal target pulse value.

On the other hand, if a result of the determination in step S11 is that the search is terminated for the search range, an ideal target pulse value is determined using a minimum value determination (S13). This is the case where a target drive amount at which an evaluation value becomes zero has not been found. In this case, a target drive amount at which an evaluation value becomes minimum is obtained, a pulse value corresponding to the target drive amount is determined as an ideal target pulse value. By the processing of steps S7 to S13 or S15 described above, the second drive amount can be corrected.

When an ideal target pulse value is determined in step S13 or S15, the number of adjacent drive pulses is calculated (S17). The number of adjacent drive pulses is calculated by different methods in accordance with a drive direction of the focus lens, as indicated in the following formulas (1) and (2). When a drive direction is the infinite side $$\text{The number of adjacent drive pulses} = \text{Current position pulse} - \text{Ideal target pulse} \quad (1)$$

When a drive direction is the close side, $$\text{The number of adjacent drive pulses} = \text{Ideal target pulse} - \text{Current position pulse} \quad (2)$$

When the number of adjacent drive pulses is calculated, the flow of the actual drive amount search is terminated. By the processing described above, a rotational position of the stepping motor is instructed.

Next, calculation of target deviation of step S5 will be described, referring to the flowchart illustrated in FIG. 4.

When the flow of calculating a target deviation is entered, a search pulse value is first calculated (S20). A search pulse value Qx is obtained by adding the temporary target pulse Q calculated in step S1 of FIG. 3 and the search variable x calculated in step S3 or S12 of FIG. 3 (second drive amount). Next, a previous actual drive amount is read (S21) (first drive amount). The detection deviations illustrated in FIGS. 2A and 2B are influenced by not only a current drive amount, but also the previous actual drive amount. Accordingly, in this step, a previous actual drive amount is read from the memory 39. The read previous actual drive amount is used in step S27 (described below). Note that, even if the driving is terminated, the actual drive amount is held without being deleted so as to be read in step S21.

After a previous actual drive amount is read, a temporary drive amount is next set (S23). The temporary drive amount Dx is set by subtracting a current position pulse LD_PLS_M from the search pulse value Qx, and obtaining an absolute value of the subtracted value. In other words, a temporary drive amount Dx is obtained by the following formula (3).

$$Dx = |Qx - LD\_PLS\_M| \quad (3)$$

After a temporary drive amount is set, the processing shifts to calculation of a correction amount. In the present embodiment, three correction arithmetic operations of a drive amount reference, an LD position reference, and an excitation position reference are performed. After step S23, it is determined whether or not a temporary drive amount is greater than a small pulse drive determination value (S25). Since a correction based on a drive amount may be performed, when the drive amount is smaller than or equal to a drive amount that is the threshold (Th) as illustrated in FIG. 2B, it is determined whether or not correction is required by comparing the temporary drive amount with the threshold pulse (small pulse drive determination value). In other words, in this step, whether a temporary drive amount Dx is smaller than a small pulse drive determination value ADJ_FCS_ERROR_PLS_MIN is determined on the basis of whether or not the following formula (4) is satisfied.

$$Dx > ADJ\_FCS\_ERROR\_PLS\_MIN \quad (4)$$

If a result of the determination in step S25 is No, in other words, when the temporary drive amount is smaller than the small pulse drive determination value, it is next determined whether or not a previous drive amount is greater than the small pulse drive determination value (S27). As described above, since the tendency of detection deviations is also influenced by immediately preceding driving, it is determined whether or not a correction is performed in consideration of a previous drive amount. Here, it is determined whether a previous drive amount Dp is smaller than the small pulse drive determination value ADJ_FCS_ERROR_PLS_MIN on the basis of whether or not the following formula (5) is satisfied.

$$Dp > ADJ\_FCS\_ERROR\_PLS\_MIN \quad (5)$$

If a result of the determination in step S27 is No, in other words, when a previous drive amount is smaller than the small pulse drive determination value, next, "drive amount reference correction" arithmetic operation is performed (S29). Here, as described referring to FIG. 2B, a correction value is optimized for a temporary drive amount. Optimizing a correction value will be described below, referring to FIG. 5, and FIGS. 6A to 6D.

If a result of the determination in step S25 or S27 is Yes, or "drive amount reference correction" arithmetic operation is performed in step S29, "LD position reference correction" arithmetic operation is next performed (S31). Since the focus lens is biased by the spring 5, a detection deviation amount varies depending on a focus lens position (LD position). In this step, a correction value is optimized on the basis of a target focus lens position (LD position).

After "LD position reference correction" arithmetic operation is performed, "excitation position reference correction" arithmetic operation is next performed (S33). Here, as described referring to FIG. 2A, a correction value is optimized for an excitation position. Since an excitation position is a drive target position, a correction value is optimized based on an excitation state. These corrections will be described, referring to FIG. 5 and FIGS. 6A to 6D.

After a correction arithmetic operation for the excitation position reference is performed, an arithmetic operation for a target deviation is next performed (S35). A target deviation is obtained by adding the search variable calculated in step S3 or S12 of FIG. 3 and the correction value calculated in steps S31 and S33 of FIG. 4. In steps S25 to S33, an adjustment value is obtained in consideration of a drive amount to a current position, a drive amount from the current position to a target position, and the like, and thus a target deviation is calculated by correcting the drive amount from the current position to the target position using the adjustment value. After the target deviation is calculated, the processing returns to the original flow.

Figure 5:
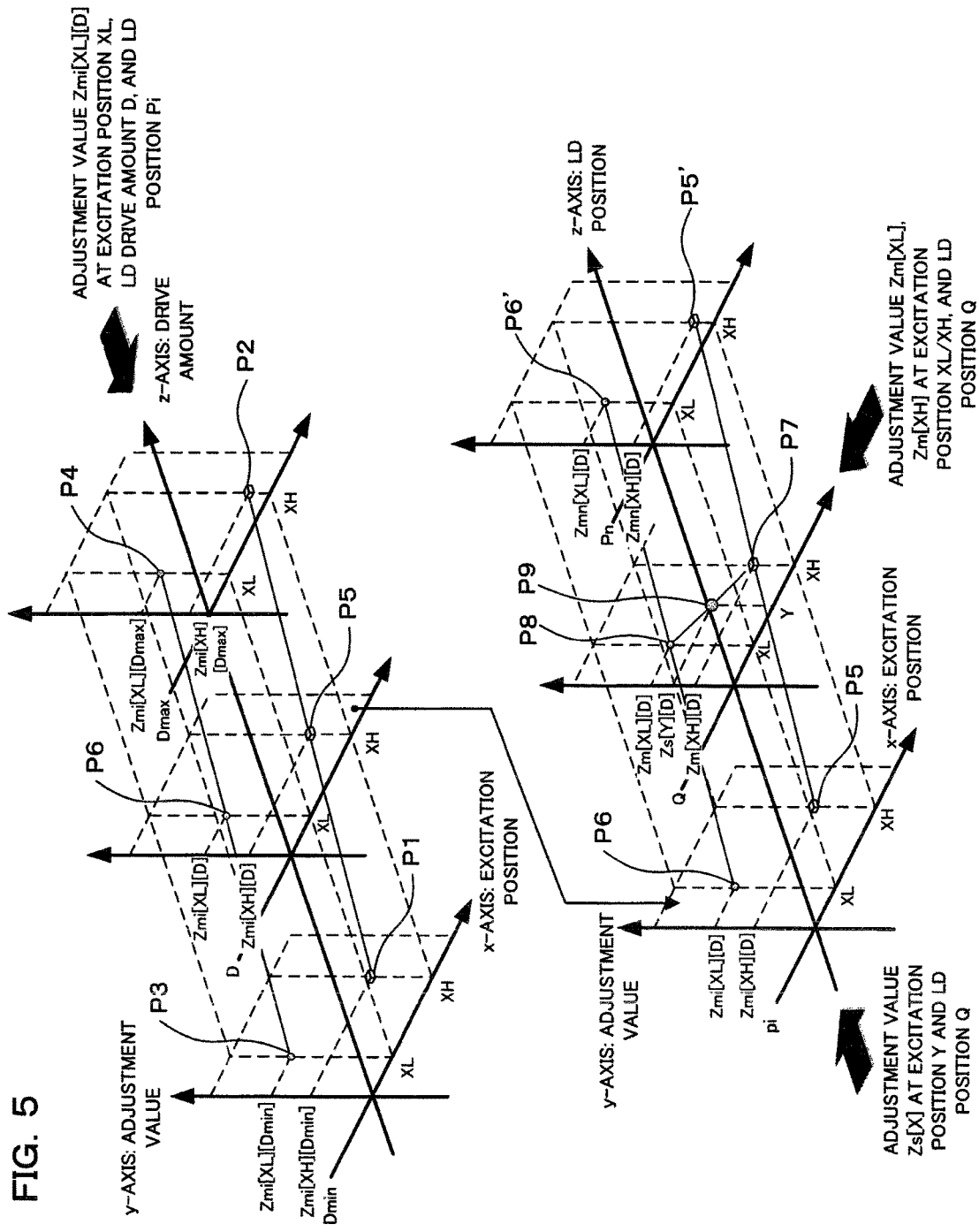
FIG. 5 is an explanatory graph of calculation of a temporary target pulse in a camera according to an embodiment of the present invention.

Next, how to obtain an adjustment value when obtaining a target deviation according to the present embodiment will be described, referring to FIG. 5 and FIGS. 6A to 6D. The upper portion of FIG. 5 is a graph illustrating the features of the invention, and illustrates that an adjustment value is calculated by an interpolation method on the basis of a drive amount to a current position and an excitation position at a target position. In other words, an adjustment value varies depending on a current drive amount of the focus lens and a position of a moving destination of the focus lens.

A table that indicates a relationship between a drive amount (drive amount represented on the x-axis of FIG. 2B) and an adjustment value corresponding to an excitation position (excitation position represented on the x-axis of FIG. 2A) is stored in the memory 39, but the data is only discretely stored. Accordingly, the adjustment value is calculated by an interpolation method on the basis of drive amounts and excitation positions stored in the table.

Note that the x-axes in the upper and lower portions of FIG. 5 represent an excitation position, which are represented by 1/64 µstep, respectively, and the y-axes thereof represent adjustment value, which are represented by pls [management pulse unit], respectively. The z-axis in the upper portion of FIG. 5 represents a drive amount, which is represented by pls [management pulse unit], and the z-axis in the lower portion of FIG. 5 represents an LD position, which is represented by pls [management pulse unit].

In the example illustrated in the upper portion of FIG. 5, P5(XH, DZmi[XH][D]) and P6 (XL, Zmi[XH][D]) are obtained by an interpolation method using four points, in other words, P1 (XH, Zmi[XH][Dmin]), P2(XH, Zmi[XH][Dmax]), P3(XL, Zmi[XL][Dmin]), and P4(XL, Zmi[XL][Dmax]).

Figure 6A:
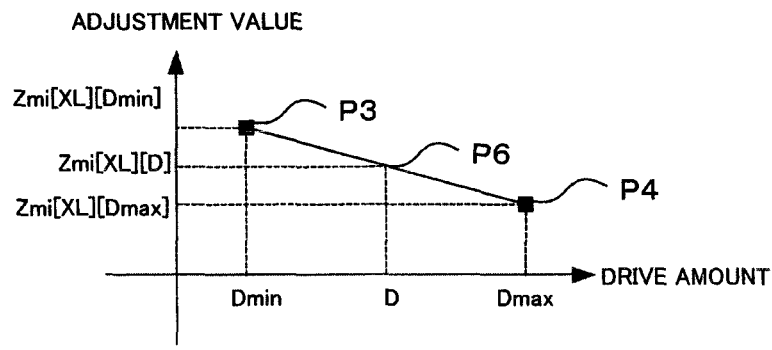
FIGS. 6A to 6D are explanatory graphs of calculation of a temporary target pulse in a camera according to an embodiment of the present invention.
Figure 6B:
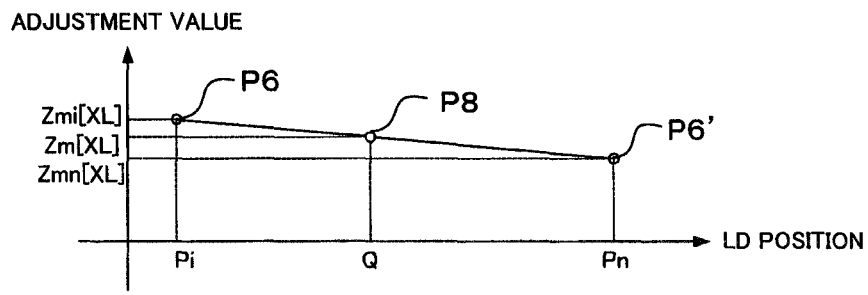
Figure 6C:
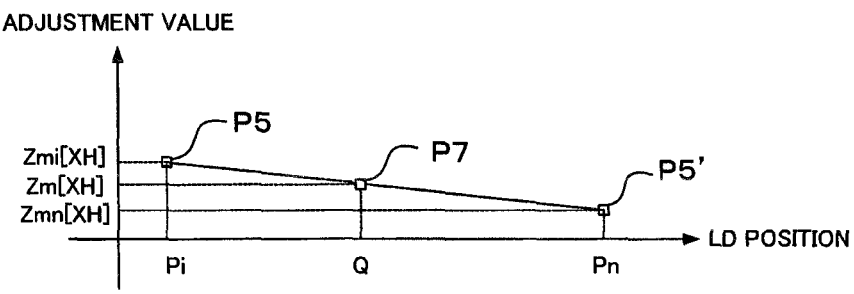
Figure 6D:
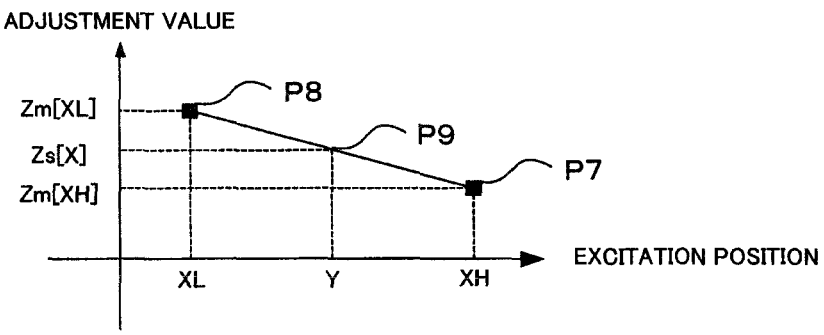

FIGS. 6A to 6D are explanatory graphs of calculation of P5 and P6 by an interpolation method. All the vertical axes (y-axis) of FIGS. 6A to 6D represent adjustment values, which are represented by pls [management pulse unit]. The horizontal axis (x-axis) of FIG. 6A represents a drive amount, which is represented by pls [management pulse unit]. The horizontal axes (x-axis) of FIGS. 6B and 6C represent LD positions, which are represented by pls [management pulse unit]. The horizontal axis (x-axis) of FIG. 6D represents an excitation position, which is represented by the unit of 1/512 µstep.

FIG. 6A illustrates calculation of an adjustment value Zmi[XL][D] when an excitation position is XL, an LD drive amount is D, and an LD position is Pi. In FIG. 6A, the respective symbols have meanings as follows.

Zmi[XL][Dmin]: Detection deviation at the excitation position XL and the drive instructed amount Dmin (auxiliary management pulse unit)

Zmi[XL][Dmax]: Detection deviation at the excitation position XL and the drive instructed amount Dmax (auxiliary management pulse unit)

Zmi[XL][D]: Detection deviation at the excitation position XL and the drive instructed amount D (auxiliary management pulse unit)

XL: Adjustment index

Dmin: Small pulse drive reference value (management pulse unit)

Dmax: Small pulse drive determination value (management pulse unit)

D: Temporary drive amount (auxiliary management pulse unit)

Note that the auxiliary management pulse unit is set to a pulse unit finer than the management pulse unit. For example, when for a management pulse unit, 1 pls corresponds to the unit of 256 µsteps, it is set so that for an auxiliary management pulse unit, 1 pls corresponds to the unit of 512 µsteps. The auxiliary management pulse unit is used to ensure accuracy of calculation.

As will been seen from FIG. 6A, an adjustment value (management pulse unit) at P6, in other words, Zmi[XL][D] can be calculated by interpolating P3 and P4 by the following formula (6).

$$Zmi[XL][D]=[\{(D/C)-Dmin\}\times(Zmi[XL][Dmax]-Zmi[XL][Dmin])/(Dmax-Dmin)]+Zmi[XL][Dmin] \quad (6)$$

C: Unit conversion coefficient (management pulse unit <=> auxiliary management pulse unit)

Note that an adjustment value at P5, in other words, Zmi[XH][D] can be obtained by interpolating P1 and P2 as the formula (1). In other words, Zmi[XH][D] can be calculated by replacing Zmi[XL][Dmin] and Zmi[XL][Dmax] with Zmi[XH][Dmin] and Zmi[XH][D] in the formula (6).

Using the formula (6) described above, P5 and P6 are calculated, and, Zmn[XH][D] at P5' and Zmn[XL][D] at P6' are calculated. Note that Zmi represents a detection deviation in the vicinity of a reference pulse value at the infinite side, and Zmn represents a detection deviation in the vicinity of the reference pulse value at the close side.

The lower portion of FIG. 5 is the same as the upper portion of FIG. 5 in that the x-axis represents an excitation position (1/64 µstep) and the y-axis represents an adjustment value (pls [management pulse unit]), but the z-axis represents an focus lens position (LD position) (pls [management pulse unit]). Moreover, P5 and P6 are detection deviations in the vicinity of a reference pulse position at the infinite side which are calculated at the upper portion of FIG. 5, and P5' and P6' indicate detection deviations in the vicinity of the reference pulse value on the close side which are calculated in the same manner as P5 and P6. Next, in the lower portion of FIG. 5, an adjustment value is calculated on the basis of a movement amount that the focus lens will move.

Therefore, P7 is calculated by interpolating P5 and P5', and P8 is calculated by interpolating P6 and P6'. When P7 and P8 are calculated, P9 is calculated by interpolating P7 and P8. The P9 is an adjustment value used in driving the focus lens.

FIGS. 6B and 6C illustrate a situation in which P7 is calculated by interpolating P5 and P5', and P8 is calculated by interpolating P6 and P6'. FIG. 6B illustrates calculation of an adjustment value Zm[XL] when an excitation position is XL, and an LD position is Q. In addition, FIG. 6C illustrates calculation of an adjustment value Zm[XH] when an excitation position is XH, and an LD position is Q.

In FIGS. 6B and 6C, each of the symbols means as follows.

Zmi[XL]: Detection deviation in the vicinity of an infinite side reference pulse value (auxiliary management pulse unit)

Zmn[XL]: Detection deviation in the vicinity of a close side reference pulse value (auxiliary management pulse unit)

Zm: Detection deviation in the vicinity of a temporary target pulse (auxiliary management pulse unit)

Pi: Infinite side reference pulse value (management pulse unit)

Pn: Close side reference pulse value (management pulse unit)

Q: Temporary target pulse value (auxiliary management pulse unit)

C: Unit conversion coefficient management pulse unit <=> auxiliary management pulse unit P8 (Zm[XL]) is calculated by an interpolation method by the following formula (7).

$$Zm[XL]=[\{(Q/C)-Pi\} \times (Zmn[XL]-Zmi[XL])]/(Pn-Pi)+Zmi[XL] \quad (7)$$

Moreover, P7(Zm[XH]) is calculated by an interpolation method by the following formula (8).

$$Zm[XH]=[\{(Q/C)-Pi\} \times (Zmn[XH]-Zmi[XH])]/(Pn-Pi)+Zmi[XH] \quad (8)$$

FIG. 6D illustrates calculation of an adjustment value Zs[X] when an excitation position is Y, and an LD position is Q. In other words, FIG. 6D illustrates a situation in which P9(Zs[X]) that is a temporary target pulse value is calculated by interpolating P8(Zm[XL]) and P7(Zm[XH]) which have been calculated by the formulas (7) and (8) described above.

In FIG. 6D, each of the symbols means as follows.

Zm[XL]: Detection deviation (auxiliary management pulse unit) at XL

Zm[XH]: Detection deviation (auxiliary management pulse unit) at XH

Zs[Y]: Detection deviation (auxiliary management pulse unit) at a temporary target pulse value XL: Adjust index XH: Adjust index+1

Y: Excitation position (1/512 μunit) at a temporary target pulse value

W: Excitation unit conversion coefficient

P9(Zs[Y]) is calculated by an interpolation method by the following formula (9).

$$Zs[Y]=\{(Y/W-XL) \times (Zm[XH]-Zm[XL])\} \div (XH-XL)+Zm[XL] \quad (9)$$

As illustrated in FIG. 5 and FIGS. 6A to 6D, in the present embodiment, first, adjustment values at two points (P5, P6) (y-axis in the upper portion of FIG. 5) are calculated by an interpolation method using four points (P1 to P4) from the table stored in the memory 39 on the basis of a drive amount to a current position (z-axis in the upper portion of FIG. 5) and an excitation position at the current position (x-axis in the upper portion of FIG. 5). Similarly, adjustment values at two points (P5' and P6') are calculated.

Next, adjustment values at two points (P7, P8) (y-axis in the lower portion of FIG. 5) are calculated by an interpolation method using four points (P5, P5', P6, P6') from the table stored in the memory 39 on the basis of a drive amount to a target position (z-axis in the lower portion of FIG. 5) and an excitation position (x-axis in the lower portion of FIG. 5). Then, an adjustment value at P9 is calculated by an interpolation method using the calculated adjustment values at the two points (P7, P8). By correcting a drive amount to the target position using the adjustment value, a target deviation can be calculated.

As described above, the camera according to an embodiment of the present invention has a lens control apparatus for moving a lens in an optical axis direction, the apparatus including the stepping motor 6 for driving the lens, and a controller for obtaining a drive amount on the basis of an input target position, instructing a rotational position of the stepping motor to drive the lens (for example, refer to S1 and S17 of FIG. 3). Then, when instructing the rotational position, the controller obtains; in accordance with a first drive amount when the stepping motor is driven to a current position (for example, refer to S21 of FIG. 4, z-axis in the upper portion of FIG. 5) and a second drive amount from the current position to the target position (for example, refer to S1 of FIG. 3, and z-axis in the lower portion of FIG. 5), a third drive amount (for example, refer to S17 of FIG. 3, and S35 of FIG. 4) obtained by correcting the second drive amount, and instructs a rotational position on the basis of the third drive amount.

Accordingly, when drive control of the stepping motor is performed, stop accuracy of driving can be improved. In particular, by correcting a drive amount to a target position in accordance with a drive amount to a current position (first drive amount), more accurate drive stop control can be performed.

Moreover, in an embodiment of the present invention, when the stepping motor is stopped by changing a drive amount for the same excitation phase, a drive amount which becomes a boundary between a region A where a required adjustment value does not change for a drive amount (to the right side from the threshold Th of FIG. 2B) and a region B where a required adjustment value changes for a drive amount (to the left side from the threshold Th of FIG. 2B) is held as a determination value. Accordingly, it is possible to calculate an accurate adjustment value. Moreover, the correction value includes a total of two values: a value acquired at one drive amount in the region A, and a value acquired at one drive amount in the region B (refer to S25 to S29 of FIG. 4). As described above, it is possible to reduce the memory capacity than in the case that adjustment values are held for all assumed drive amounts.

Moreover, in an embodiment of the present invention, if both an immediately preceding drive amount and a current drive amount are smaller than or equal to a determination value (for example, refer to S25 and S27 of FIG. 4), a correction value in accordance with a drive amount instruction is obtained by an linear interpolation using two correction values (for example, refer to S29 of FIG. 4). Otherwise, a correction value of the region A is used as it is. As a result, it is possible to perform an accurate correction that is not based on driving conditions.

Note that, although the GMR sensor 9 is used for detecting a rotational position in an embodiment of the present invention, any position sensor capable of detecting a position such as optical encoder may be used, without being limited to the foregoing.

In addition, although description has been provided using a digital camera as an imaging device in the present embodiment, the camera may be a digital single-lens reflex camera, a mirrorless camera, or a compact digital camera, or may be a camera for capturing video images such as a video camera or a movie camera, or may be a camera which is built in a mobile phone, a smart phone, a personal digital assistant, a personal computer (PC), a tablet type computer, a game device or the like. The present invention may be applied to any device, regardless of the type, which performs drive control of a lens.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A lens control apparatus for moving a lens in an optical axis direction, comprising:
   a stepping motor for driving the lens;
   a memory for storing a deviation amount between a rotational position generated when the stepping motor is driven for the same rotational position with different drive amounts, and an actually-stopped rotational position, and a determination value for determining whether or not the deviation amount depends on the drive amount; and
   a processing circuit for obtaining a drive amount on the basis of an input target position, instructing a rotational position of the stepping motor to perform drive control,
   wherein the processing circuit (1) obtains, responsive to a determination that both a first drive amount when the stepping motor is driven to a current position, and a second drive amount from the current position to the target position, are smaller than the determination value, a correction value for the correction based on the deviation amount,
   (2) obtains a third drive amount using the second drive amount and the correction value, and
   (3) instructs a rotational position on the basis of the third drive amount.

2. The lens control apparatus according to claim 1, wherein the processing circuit, responsive to a determination that at least one of the first drive amount and the second drive amount is greater than the determination value, obtains a correction value based on a deviation amount in a region where the deviation amount does not depend on a drive amount.

3. The lens control apparatus according to claim 1, wherein the memory holds a plurality of deviation amounts in accordance with a relationship between the first drive amount, the second drive amount and the determination value, and
wherein the processing circuit selects one of the plurality of deviation amounts, based on the relationship between the first drive amount, the second drive amount and the determination value, and uses the selected one of the plurality of deviation amounts to obtain the correction value.

4. The lens control apparatus according to claim 3, wherein the plurality of deviation amounts includes a deviation amount in a region where the deviation amount depends on a drive amount, and a deviation amount in a region where the deviation amount does not depend on a drive amount.

5. The lens control apparatus according to claim 3, wherein the determination value is a drive amount that is a boundary between a region where a deviation amount depends on a drive amount and a region where a deviation amount does not depend on a drive amount.

6. A lens control method of a lens driving apparatus having a stepping motor for moving a lens in an optical axis direction, for obtaining a drive amount on the basis of an input target position, and instructing a rotational position of the stepping motor to drive, the method comprising:
   reading a first drive amount when the stepping motor is driven to a current position;
   obtaining a correction value for the correction from a deviation amount between the rotational position generated when the stepping motor is driven for the same rotational position with different drive amounts, and an actually stopped rotational position;
   obtaining, responsive to a determination that both the first drive amount and a second drive amount from the current position to the target position, are smaller than a determination value for determining whether or not the deviation amount depends on the drive amount, a correction value based on the deviation amount;
   obtaining a third drive amount by correcting the second drive amount using the correction value; and
   instructing a rotational position on the basis of the third drive amount.

7. A lens control method for use with a lens driving apparatus having a stepping motor for moving a lens in directions along an optical axis of the lens, the method comprising:
   obtaining a first drive amount value corresponding to a number of pulse drives needed to have the stepping motor move the lens to a target position on the optical axis;
   reading a previously stored second drive amount value corresponding to a previous actual drive amount;
   responsive to a determination that both the first drive amount value and the second drive amount value are smaller than a drive amount threshold for defining whether or not a deviation amount corresponding to a difference between an instructed stop position of the stepping motor and a detected stop position of the stepping motor, depends on the drive amount,
   (1) determining the deviation amount based on at least one of the first drive amount value and the second drive amount value, and (2) determining a correction value based on the deviation amount, and otherwise, responsive to a determination that neither of the first drive amount value and the second drive amount value is smaller than the drive amount threshold, (1) determining a correction value based on a fixed deviation amount;

obtaining a third drive amount value by correcting one of the first drive amount value and the second drive amount value using the correction value; and controlling the stepping motor using the third drive amount value.

8. The method of claim 7 wherein the deviation is a detent torque deviation of the stepping motor.

\* \* \* \* \*